United States Patent
Foo et al.

(10) Patent No.: US 10,737,658 B2
(45) Date of Patent: *Aug. 11, 2020

(54) HYBRID METHOD AND APPARATUS FOR DETECTING A VEHICLE/PEDESTRIAN IMPACT

(71) Applicant: TRW AUTOMOTIVE U.S. LLC, Livonia, MI (US)

(72) Inventors: Chek-Peng Foo, Ann Arbor, MI (US); Huahn-Fern Yeh, Novi, MI (US); Ying-chang Lee, Middleton, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 178 days.

This patent is subject to a terminal disclaimer.

(21) Appl. No.: 15/810,437

(22) Filed: Nov. 13, 2017

(65) Prior Publication Data
US 2018/0065592 A1    Mar. 8, 2018

Related U.S. Application Data

(62) Division of application No. 14/401,877, filed as application No. PCT/US2012/038982 on May 22, 2012, now Pat. No. 9,855,915.

(51) Int. Cl.
*B60R 21/38* (2011.01)
*B60R 21/34* (2011.01)
(Continued)

(52) U.S. Cl.
CPC .............. *B60R 21/38* (2013.01); *B60R 21/00* (2013.01); *B60R 21/0132* (2013.01);
(Continued)

(58) Field of Classification Search
CPC ..... B60R 21/38; B60R 21/00; B60R 21/0132; B60R 21/0136; B60R 21/34; B60R 21/36; B60R 19/483
See application file for complete search history.

(56) References Cited

U.S. PATENT DOCUMENTS

| | | |
|---|---|---|
| 5,436,838 A | 7/1995 | Miyamori |
| 6,600,412 B2 | 7/2003 | Ishizaki et al. |
| | (Continued) | |

FOREIGN PATENT DOCUMENTS

| | | |
|---|---|---|
| DE | 102008008746 | 8/2008 |
| DE | 102008008746 | 9/2009 |
| | (Continued) | |

OTHER PUBLICATIONS

PCT/US2012/038982 International Search Report & Written Opinion Completed Jul. 18, 2012.
(Continued)

*Primary Examiner* — Sze-Hon Kong
(74) *Attorney, Agent, or Firm* — Tarolli, Sundheim, Covell & Tummino LLP

(57) ABSTRACT

An apparatus detects a vehicle/pedestrian impact event by sensing impact events near a forward location of a vehicle using both acceleration sensors and pressure sensors and providing associated signals indicative thereof, determining metric values for each of the sensor signals, and determining if a vehicle/pedestrian impact has occurred in response to the determined metric values.

10 Claims, 10 Drawing Sheets

(51) Int. Cl.
  *B60R 21/36* (2011.01)
  *B60R 21/0132* (2006.01)
  *B60R 21/00* (2006.01)
  *B60R 21/0136* (2006.01)
  *B60R 19/48* (2006.01)

(52) U.S. Cl.
  CPC .......... *B60R 21/0136* (2013.01); *B60R 21/34* (2013.01); *B60R 21/36* (2013.01); *B60R 19/483* (2013.01)

(56) References Cited

U.S. PATENT DOCUMENTS

| | | | |
|---|---|---|---|
| 6,784,792 | B2 | 8/2004 | Mattes et al. |
| 7,137,472 | B2 | 11/2006 | Aoki |
| 7,148,792 | B2 | 12/2006 | Takafuji et al. |
| 7,236,866 | B2 | 6/2007 | Takafuji et al. |
| 7,347,464 | B2 | 3/2008 | Tanabe |
| 7,359,781 | B2 | 4/2008 | Foo et al. |
| 7,488,015 | B2 | 2/2009 | Lu et al. |
| 7,509,191 | B2 | 3/2009 | Mae |
| 7,721,838 | B2 | 5/2010 | Takahashi |
| 7,828,350 | B2 | 11/2010 | Kiribayashi |
| 7,911,331 | B2 | 3/2011 | Tanabe |
| 8,413,526 | B2 | 4/2013 | Hamabe et al. |
| 8,428,862 | B2 | 4/2013 | Mase et al. |
| 8,751,113 | B2 | 6/2014 | Foo et al. |
| 2002/0043417 | A1* | 4/2002 | Ishizaki .............. B60R 21/0136 180/274 |
| 2004/0158376 | A1* | 8/2004 | Knueppel ............. B60R 21/013 701/45 |
| 2004/0186643 | A1 | 9/2004 | Tanaka et al. |
| 2005/0092061 | A1* | 5/2005 | Takafuji .............. B60R 21/0136 73/12.09 |
| 2006/0095183 | A1* | 5/2006 | Schuller ................ B60R 21/013 701/45 |
| 2006/0208510 | A1* | 9/2006 | Takahashi ........... B60R 21/0136 293/102 |
| 2006/0231321 | A1* | 10/2006 | Takahashi ........... B60R 21/0136 180/274 |
| 2007/0219692 | A1* | 9/2007 | Kuhn .................. B60R 21/0132 701/45 |
| 2009/0276112 | A1* | 11/2009 | Mack .................... B60R 21/013 701/31.4 |
| 2010/0004819 | A1* | 1/2010 | Katz .................... B60R 21/0132 701/36 |
| 2010/0017067 | A1* | 1/2010 | Kolatschek ......... B60R 21/0132 701/46 |
| 2010/0030433 | A1 | 2/2010 | Suzuki |
| 2011/0015804 | A1* | 1/2011 | Cluff .................. B60R 21/0132 701/1 |
| 2012/0271509 | A1* | 10/2012 | Nehls .................. B60R 21/0136 701/34.4 |

FOREIGN PATENT DOCUMENTS

| | | |
|---|---|---|
| DE | 10002110 | 7/2011 |
| DE | 102012101296 | 2/2012 |
| JP | 2009196463 | 9/2009 |
| WO | 03082639 | 10/2003 |

OTHER PUBLICATIONS

PCTUS13/26589 International Search Report & Written Opinion, Completed Apr. 3, 2013.

* cited by examiner

HYBRID METHOD AND APPARATUS FOR DETECTING A VEHICLE/PEDESTRIAN IMPACT

RELATED APPLICATION

This application is a divisional of U.S. patent application Ser. No. 14/401,877, filed Apr. 9, 2015, and which is a U.S. National Stage Application filed under 35 U.S.C. § 371 of PCT/US2012/038982, filed on May 22, 2012. The disclosures of these applications are hereby incorporated by reference in their entireties.

TECHNICAL FIELD

The present invention relates to a protection system and, more particularly, to a hybrid method and apparatus for detecting a vehicle/pedestrian impact using both acceleration and pressure detection.

BACKGROUND OF THE INVENTION

Vehicle occupant protection devices for helping to protect a vehicle occupant during a vehicle event such as a crash, roll-over, etc., are known. To detect such a vehicle event, one or more event sensors are mounted to the vehicle and provide signals indicative of sensed vehicle event conditions for which actuation of the protection device may be desired. The event sensors are connected to an electronic controller that evaluates the event sensor signals using appropriate event metrics to monitor and determine if a particular event is occurring, e.g., a vehicle crash condition. Upon determining the occurrence of a particular type of vehicle event by the electronic controller, the vehicle occupant protection devices, e.g., air bags, inflatable side curtains, etc., are actuated.

Pedestrian protection systems have been proposed to aid in reducing pedestrian injury when the pedestrian is struck by a moving vehicle (a "vehicle/pedestrian impact"). Some proposed pedestrian protection systems include a sensor mounted in the vehicle bumper. If the sensor detects an impact with a pedestrian, an actuatable device is actuated to mitigate the impact effect. Such actuatable devices include, for example, actuators to raise the trailing end of the hood upward. Actuatable forward mounted air bags have also been proposed to mitigate vehicle/pedestrian impact effects.

SUMMARY OF THE INVENTION

In accordance with the present invention, a method and apparatus are provided for determining vehicle/pedestrian impact metric values using forward mounted accelerometers and pressure sensors and analyzing the values to determine if a vehicle/pedestrian impact is occurring.

In accordance with one example embodiment of the present invention, an apparatus is provided for detecting a vehicle/pedestrian impact comprising a least one acceleration sensor mounted near a forward location of a vehicle for providing an associated acceleration signal indicative of an impact event. At least one pressure sensor is mounted near the forward location of the vehicle for providing an associated pressure signal indicative of an impact event. A controller determines if a vehicle/pedestrian impact event has occurred in response to the acceleration signal and the pressure signal.

In accordance with another example embodiment of the present invention, an apparatus is provided for detecting a vehicle/pedestrian impact comprising a least one acceleration sensor mounted near a forward location of a vehicle for providing an associated acceleration signal indicative of an impact event. At least one multi-channel pressure sensor having a plurality of pressure hoses is connected thereto, the plurality of pressure hoses being mounted at associated different locations along a forward structure of the vehicle, each pressure hose providing an associated pressure indication to the multi-channel pressure sensor of an impact event, the multi-channel pressure sensor providing an associated electrical signal indicative of an impact event encountered by any of the pressure hoses. A controller is provided for determining if a vehicle/pedestrian impact event has occurred in response to the acceleration signal and the associated electrical signal from the multi-channel pressure sensor and for providing an actuation control signal in response thereto.

In accordance with another example embodiment of the present invention, an apparatus is provided for detecting a vehicle/pedestrian impact comprising a plurality of acceleration sensors each mounted near a forward location of a vehicle for providing associated acceleration signals indicative of a vehicle/pedestrian impact event. At least one pressure sensor is mounted near the forward location of the vehicle for providing an associated pressure signal indicative of an impact event, and a controller is provided for determining if a vehicle/pedestrian impact event has occurred in response to the acceleration signals and the pressure signal and for providing an actuation control signal in response thereto.

In accordance with another example embodiment of the present invention, a method is provided for detecting a vehicle/pedestrian impact comprising the steps of sensing impact events near a forward location of a vehicle using both acceleration sensors and pressure sensors and providing associated signals indicative thereof, determining vehicle/pedestrian impact metric values for each of the sensor signals and determining if a vehicle/pedestrian impact has occurred in response to the determined vehicle/pedestrian impact metric values.

DETAILED DESCRIPTION OF THE DRAWINGS

The foregoing and other features and advantages of the present invention will become apparent to one skilled in the art upon consideration of the following description of exemplary embodiments of the invention and the accompanying drawings, in which.

DETAILED DESCRIPTION OF EXEMPLARY EMBODIMENTS

Figure 1:
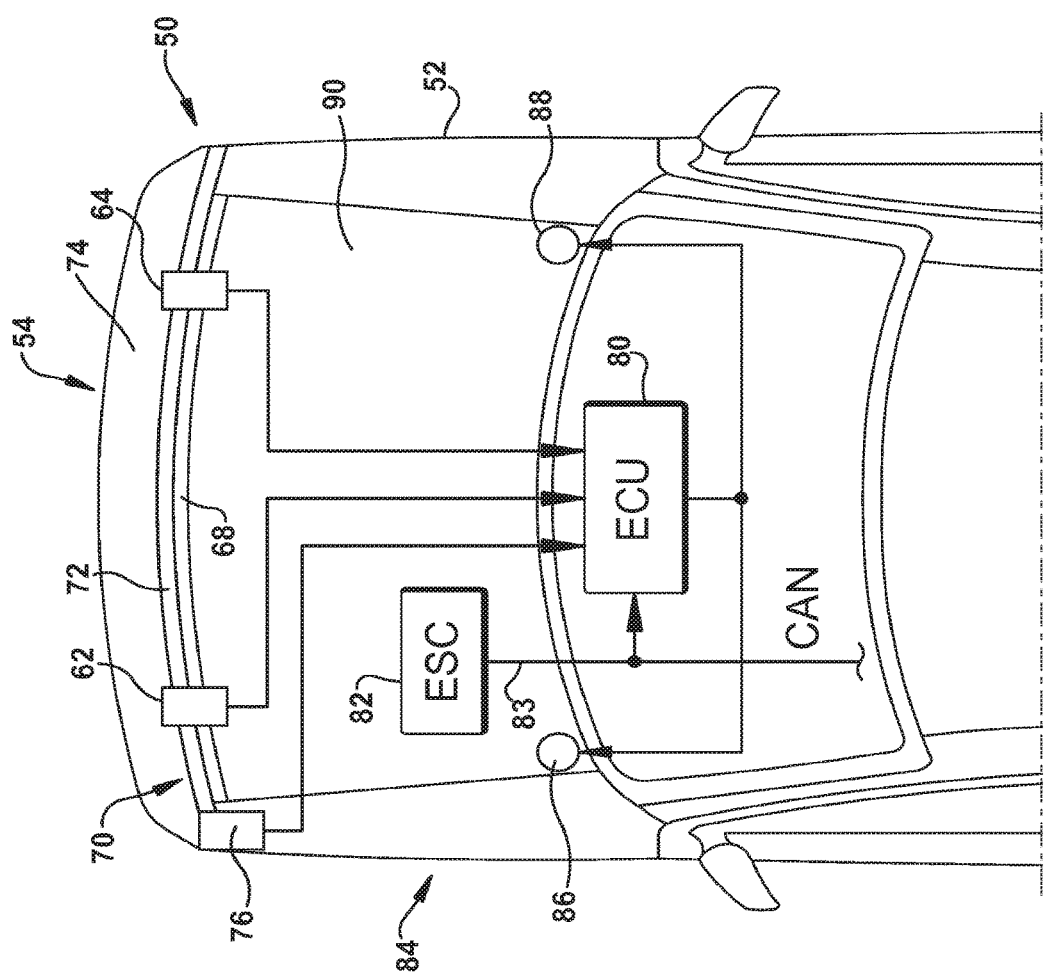
FIG. 1 illustrates a vehicle/pedestrian impact detection device in accordance with one exemplary embodiment of the present invention.

Referring to FIG. 1, a detection apparatus 50, in accordance with an exemplary embodiment of the present invention, is provided for detecting a vehicle/pedestrian impact event. The detection apparatus 50 includes a plurality of sensors 54 mounted at the front portion of a vehicle 52. In accordance with one example embodiment of the present invention, shown specifically in FIG. 1, the sensors 54 include a plurality of acceleration sensors 62, 64 mounted in a spaced apart fashion to a forward cross-member 68 (e.g., a bumper cross-beam) of the vehicle 52 so as to be positioned at a left front location and a right front location, respectively, of the vehicle 52. A sensing architecture that uses acceleration sensors mounted near the front of a vehicle for vehicle/pedestrian impact detection can be found in co-pending patent application U.S. Ser. No. 12/778,505 filed May 12, 2010 to Foo et al. (U.S. Patent Application Publication No. 2011/0282553 published Nov. 17, 2011) which is hereby fully incorporated herein by reference.

The acceleration sensors 62, 64, in accordance with an example embodiment of the present invention, are multi-axis acceleration sensors ("MAS"), although single-axis acceleration sensors ("SAS") could alternatively be used. The acceleration sensors 62, 64 each provide an associated electrical signal having electrical characteristics (e.g., frequency, amplitude, etc.) indicative of a sensed acceleration as a result of an impact event between the vehicle 52 and an object such as a pedestrian (not shown). This type of impact event is referred to herein as a "vehicle/pedestrian impact event."

The sensors 54 further include a pressure sensor assembly or arrangement 70. The pressure sensor assembly 70 includes a pressure tube or hose 72 secured to the front of the forward cross-member 68. The front bumper structure of the vehicle 52 includes energy absorbing foam 74 that contacts a forward facing portion of the pressure hose 72. The pressure sensor assembly 70 further includes a pressure sensor 76 operatively connected to and in operative fluid communication with the pressure hose 72. The pressure hose 72 is sealed at the distal end opposite the end connected to the pressure sensor 76. The pressure hose 72 is an open tube (i.e., hollow) filled with a gas, such as air but is, in effect, a closed chamber being sealed off at the distal end and in fluid communication with the pressure sensor 76. If the vehicle bumper is pushed in, as may occur when a pedestrian is hit by the vehicle 52, the energy absorbing foam 74 will push against the pressure hose thereby increasing the pressure inside of the pressure hose 72. The pressure against the hose during a vehicle/pedestrian impact event squeezes the hose and decreases the hose volume that, in turn, increases air pressure within the closed hose. The increase in pressure within the pressure hose 72 will be sensed by the pressure sensor 76. The pressure sensor 76 provides an electrical output signal having an electrical characteristic indicative of sensed pressure, i.e., the pressure within the hose 72. Since this arrangement has a single pressure sensor, it is referred to herein as a single channel pressure ("SCP") sensor.

Each of the event sensors 62, 64, 76 is electrically connected to an electronic control unit ("ECU") 80 for monitoring and processing the accelerometer signals from sensors 62, 64 and the pressure signal from sensor 76. The ECU 80 may be a microcontroller, a microprocessor, discrete circuitry, and/or an application specific integrated circuit ("ASIC") designed to function in accordance with the present invention. The ECU 80 may be located within the cabin of the vehicle 52 or other area of the vehicle. The ECU 80 is connected to the accelerometers 62, 64 and pressure sensor 76 via a direct electrical connection, via a communication bus, via any other wiring arrangement, or even wirelessly. The output signal from the acceleration sensor 62 is referred to herein as PPS_MAS Left. The output signal from the acceleration sensor 64 is referred to herein as PPS_MAS Right. The output signal from the pressure sensor 76 is referred to herein as PPS_SCP.

The vehicle 52 may also include an electronic stability control ("ESC") system 82 that provides the ECU 80 with electrical signals indicative of certain other sensed vehicle operating conditions such as a vehicle speed signal. The sensor signals from the ESC system 82 can either be directly connected to the ECU 80, or sensor signals from the ECS can be communicated to the ECU 80 via the vehicle's controller area network ("CAN") Bus 83. Alternatively, a separate vehicle speed sensor could be provided for monitoring vehicle speed and sending a vehicle speed signal directly to the ECU 80.

The ECU 80 is further electrically connected to an actuatable vehicle/pedestrian impact mitigation device 84. The actuatable impact mitigation device 84 includes, in accordance with one example embodiment of the present invention, actuators 86, 88 located at the trailing end of the vehicle hood 90 so that, when actuated by the ECU 80, the actuators 86, 88 lift the trailing end of the hood 90 upward thereby allowing the slanted hood to mitigate pedestrian injury during a vehicle/pedestrian impact event. The actuators 86, 88 can be actuatable via, for example, pyrotechnics. Other means for actuating the actuators 86, 88 are also contemplated. Also, rather than hood actuators for vehicle/pedestrian impact mitigation, other actuatable devices could be used such as forward mounted air bags.

Figure 2:
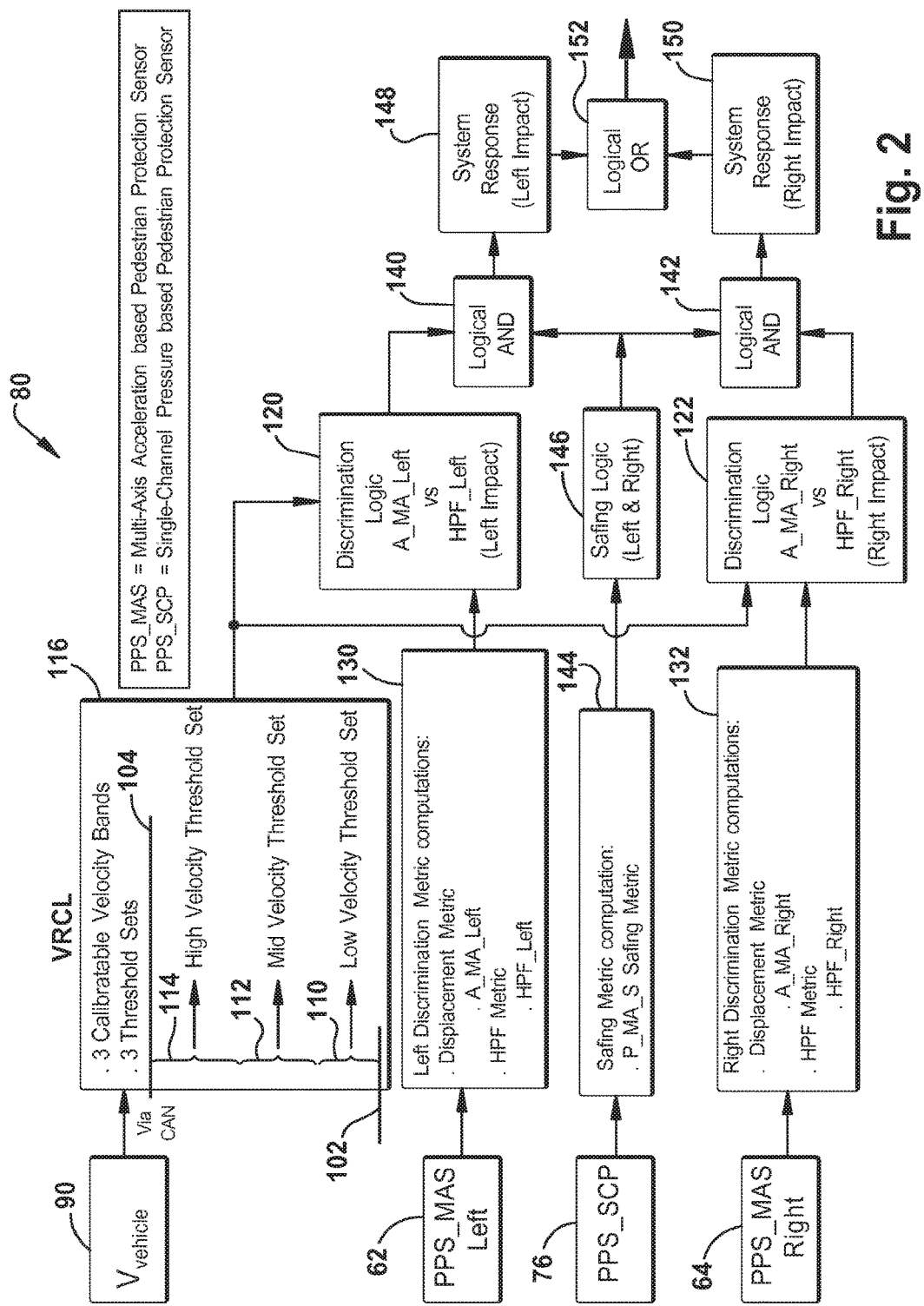
FIG. 2 is a functional block diagram showing a portion of the control logic used by the electronic control unit of FIG. 1 for detection of a vehicle/pedestrian impact in accordance with an exemplary embodiment of the present invention.

Referring to FIG. 2, the control logic performed by the ECU 80, in accordance with an example embodiment of the present invention, is shown. This control logic determines if there is a vehicle/pedestrian impact event occurring by combining information from the acceleration sensors 62, 64 and the pressure sensor 76, i.e., a determination based on a hybrid sensor arrangement combining acceleration and pressure. The vehicle speed signal from the ESC system 82 is also monitored by the ECU 80. One of a plurality of sets of threshold values is selected in response to the monitored vehicle speed value as part of the vehicle/pedestrian impact determination. In accordance with one example embodiment of the present invention, the vehicle speed being between a minimum vehicle speed value 102 and a maximum speed value 104 is classified by velocity range classifier logic ("VRCL") 116 of the ECU 80 as falling within, for example, one of three specific speed ranges. The speed or velocity values that define a particular speed range may overlap with adjacent speed range(s). Each speed range has associated therewith, a set of threshold values that are used in the control process performed by the ECU 80 for deciding whether to actuate the actuatable impact mitigation device 84, i.e., determining if a vehicle/pedestrian impact event is occurring. If the monitored vehicle speed is less than a minimum vehicle speed 102, for example 20 KPH, or if the monitored vehicle speed is greater than the maximum vehicle speed 104, for example 50 KPH, the ECU 80 will not permit actuation of the actuatable pedestrian impact mitigation device 84 regardless of the values of the signal outputs from the sensors 62, 64, and 76. Therefore, it should be appreciated that each of the speed ranges relevant for possible actuation of the actuatable devices all fall between the minimum 102 and maximum 104 vehicle speed values.

As mentioned, the sensed vehicle speed between the minimum vehicle speed 102 and the maximum vehicle speed 104 is divided or classified into one of the predetermined number of discrete speed ranges, e.g., a low-velocity range or set 110, a mid-velocity range or set 112, or a high velocity range or set 114. The mid-velocity range 112 values and the low-velocity range 110 values can have overlapping velocity values, and the mid-velocity range 112 values and the high-velocity range 114 values can have overlapping velocity values. The classification of the monitored vehicle velocity value into one of the velocity ranges by the velocity range classifier logic 116 establishes a threshold value set used in later logic processing described below. If the vehicle speed falls in an overlap velocity range area, threshold sets associated with each of the velocity ranges are used by the ECU 80 in its discrimination determination process with the results of the determinations being logically OR'ed. The threshold value set(s) selected in response to the velocity range classifier logic 116 is used in a discrimination determination functions (or discrimination logic) 120 and 122 of the ECU 80.

The ECU 80 determines acceleration metric values from the outputs PPS_MAS Left and PPS_MAS Right of the acceleration sensors 62, 64, respectively, using metric computation functions 130, 132, respectively. Specifically, the output signal from each of the accelerometers 62, 64 is monitored by the metric computation functions 130, 132, respectively, and associated displacement values are determined. The displacement values are determined using a moving average value of the acceleration signals PPS_MAS Left and PPS_MAS Right over a time widow. The moving average value of the acceleration from the PPS_MAS Left sensor 62 over the time window is referred to as A_MA_Left and is determined in left discrimination function 130. The moving average value of the acceleration from the PPS_MAS Right sensor 64 over the time window is referred to as A_MA_Right and is determined in discrimination function 132. Displacement values (double integral of acceleration) are then determined using the A_MA_Left and A_MA_Right values within the discrimination functions 130, 132, respectively. In addition to determining the displacement values based on each of the left and right acceleration signals, an impact energy value is also determined based upon each of the acceleration sensor signals from sensors 62, 64. The determined impact energy values are based on the associated acceleration sensor signals within a predetermined frequency range. The impact energy values are referred to as HPF_Left and HPF_Right. The discrimination logic functions 120 and 122 compare each determined displacement metric value A_MA_Left and A_MA_Right as a function of the determined impact energy HPF_Left and HPF_Right, respectively, against the threshold sets established by the velocity range classifier logic 116. The output of each of the discrimination logic functions 120 and 122 is electrically connected to one input of logic AND functions 140, 142, respectively.

In the discrimination logic functions 120, 122, each of the two determined displacement metric values as a function of impact energy is compared against a threshold set (two threshold sets if the vehicle speed falls within an overlap portion of the speed ranges) selected from the velocity range classifier logic 116. If the vehicle velocity value does fall within overlapped speed ranges, the comparisons of displacement as a function of impact energy against the threshold sets from both speed ranges are logically OR'ed. The discrimination logic functions 120, 122 determine if a vehicle/pedestrian impact event, as sensed by the associated acceleration sensor 62, 64, respectively, is above a predetermined value In another portion of the control logic shown in FIG. 2, the output signal PPS_SCP from the pressure sensor 76 is processed by associated metric computation function 144. The value determined by the metric computation functions 144 is a moving average value of the pressure over a time window and is referred to herein as P_MA_S. The determined pressure moving average P_MA_S is compared against an associated fixed threshold in a safing logic function 146 to determine if a vehicle/pedestrian impact event, as sensed by the pressure sensor 76, is above a predetermined value.

The output of the resultant comparison performed in the safing logic function 146 is connected to the other (the second) input of each of the logical AND functions 140, 142. The output of the logic AND function 140 represents a system response 148 for left side impacts and the output of the logic AND function 142 represents a system response 150 for right side impacts. The two system responses 148 and 150 are logically OR'ed in logic OR function 152. The output of the logic OR function 152 is used as the actuator control signal for the actuators 86, 88. In effect, the pressure sensor 76 is used as a safing function that is AND'ed with the discrimination determinations based on the left and right sensed accelerations. If certain displacement metric values (left or right) as a function of their associated determined impact energy value is greater than a predetermined threshold and a pressure metric value is greater than a predetermined amount, the actuators 86, 88 are actuated.

Figure 3:
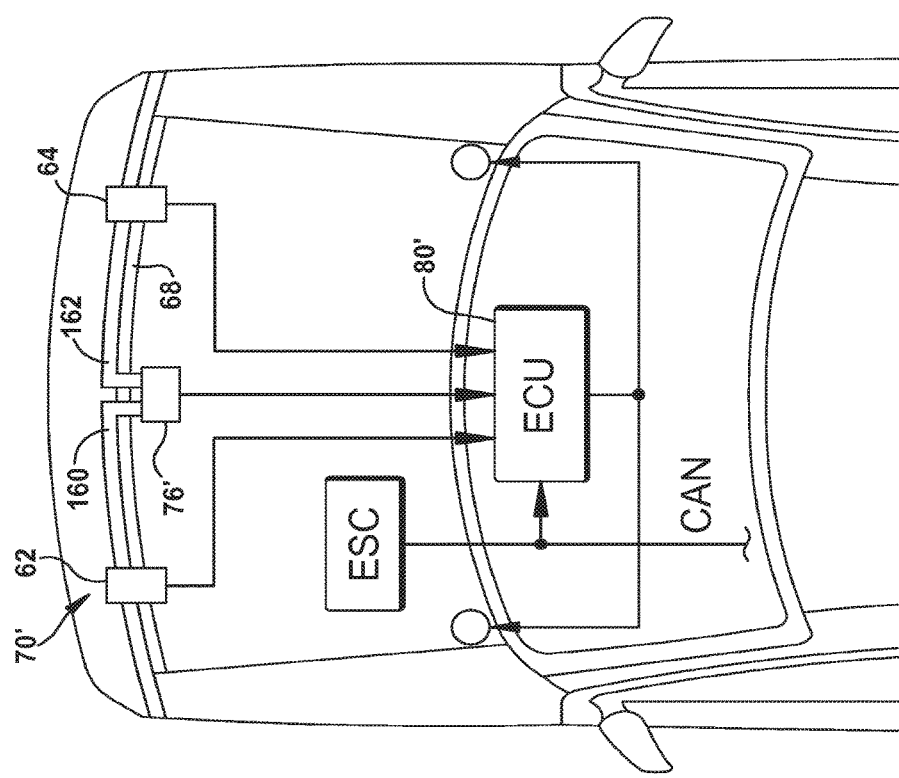
FIG. 3 illustrates a vehicle/pedestrian impact detection device in accordance with another exemplary embodiment of the present invention.

Referring to FIG. 3, a second sensor system architecture having sensors 70' is shown in accordance with another example embodiment of the present invention. In accordance with this example embodiment, acceleration sensors 62, 64 are mounted to the forward cross-member 68 as previous described. In this embodiment, a multi-channel pressure sensor 76' ("PPS_MCP") is connected to two separate pressure hoses 160 left and 162 right. The pressure sensor 76' is a dual channel pressure sensor. In this way, the pressure sensor 76' can sense pressures from impact events on both the left and right sides of the vehicle and can provide both a left pressure signal (PPS_MCP Left) and a right pressure signal (PPS_MCP Right) to the ECU 80' for processing.

Figure 4:
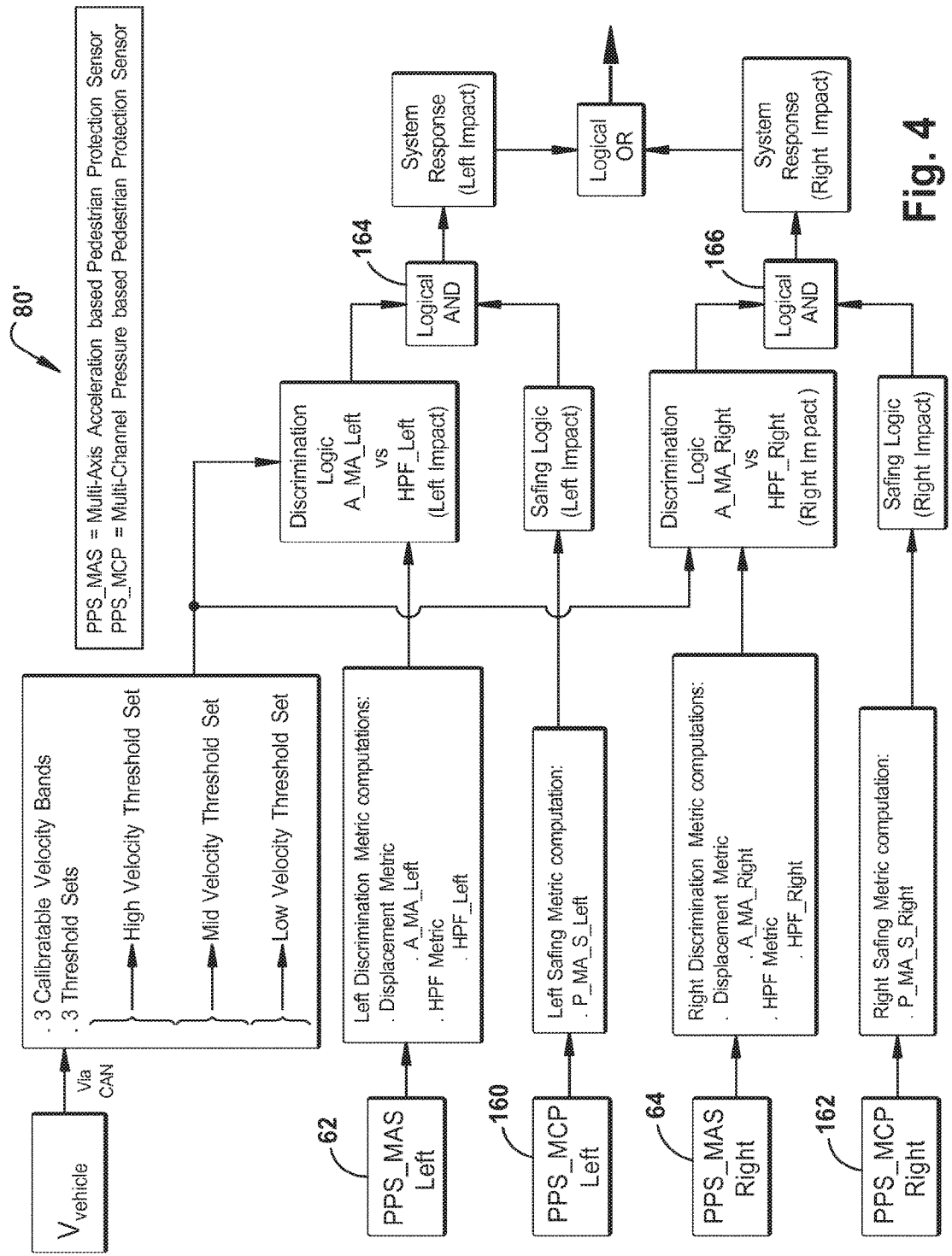
FIG. 4 is a functional block diagram showing a portion of the control logic used by the electronic control unit of FIG. 3 for detection of a vehicle/pedestrian impact in accordance with an exemplary embodiment of the present invention.

Referring to FIG. 4, the control logic followed by the ECU 80' is depicted for the sensor architecture of FIG. 3. In this control arrangement, a pressure left safing determination is logically AND'ed with the left acceleration determination in AND function 164. Similarly a pressure right safing determination is logically AND'ed with the right acceleration determination in AND function 166. In effect, instead of a safing function using one pressure sensor, the arrangement of FIG. 4 provides separate left and right pressure safing determinations with the left pressure safing determination AND'ed with the left acceleration discrimination determination and the right pressure safing determination AND'ed with the right acceleration discrimination determination.

Figure 5:
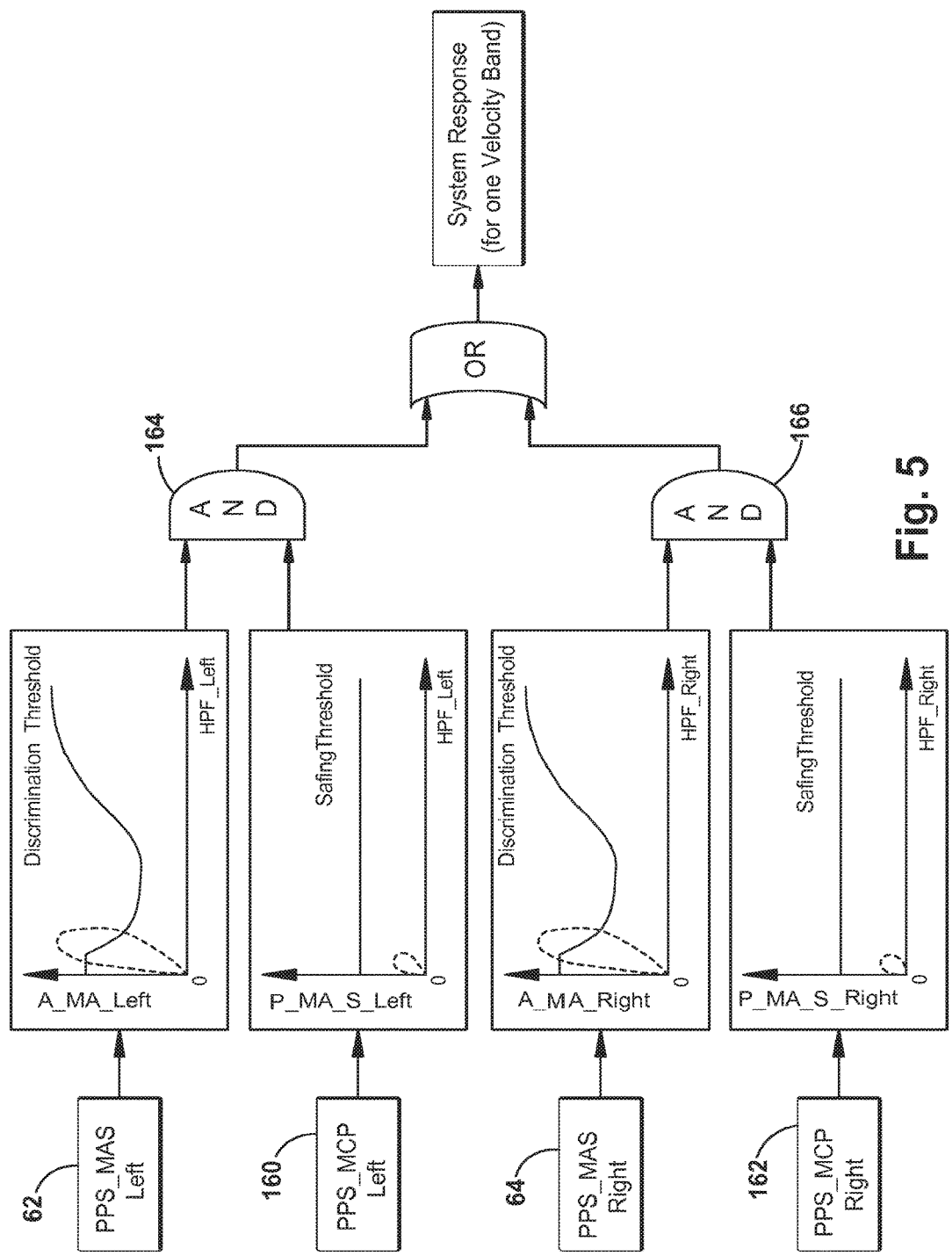
FIGS. 5-8 are block diagrams showing portions of discrimination control logic followed by the electronic control unit of FIG. 3 during different type of vehicle/pedestrian impact events in accordance with an exemplary embodiment of the present invention.
Figure 6:
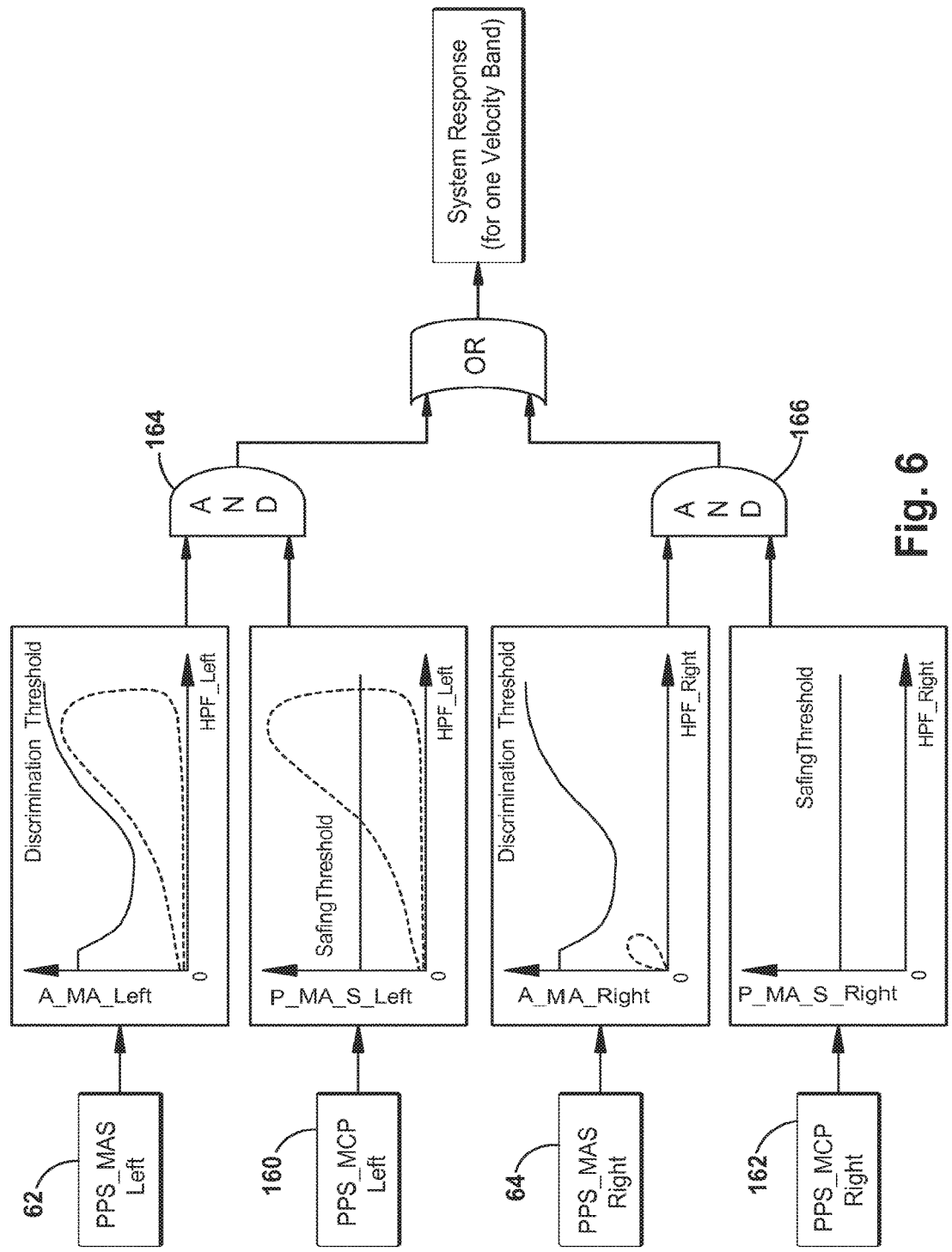
Figure 7:
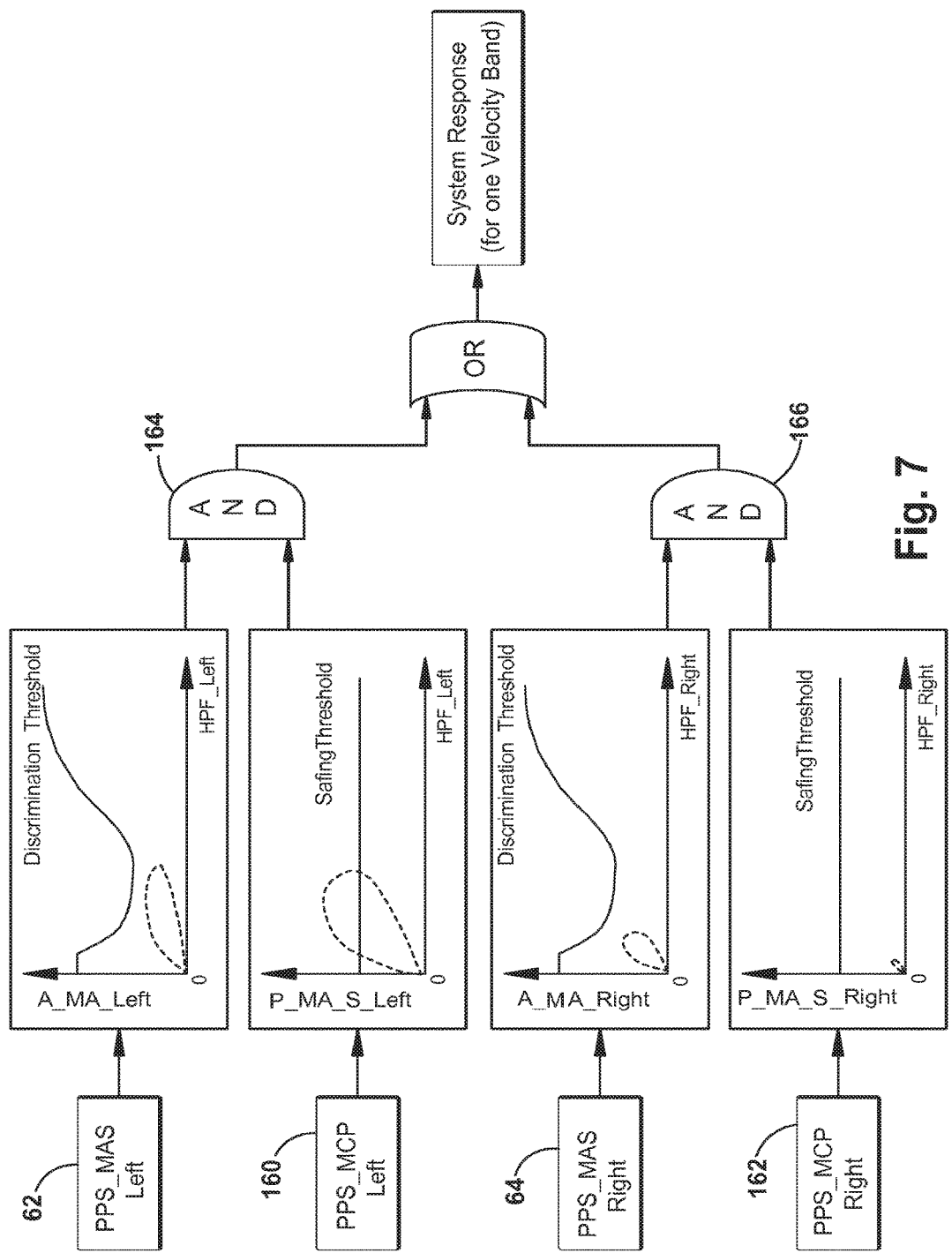
Figure 8:
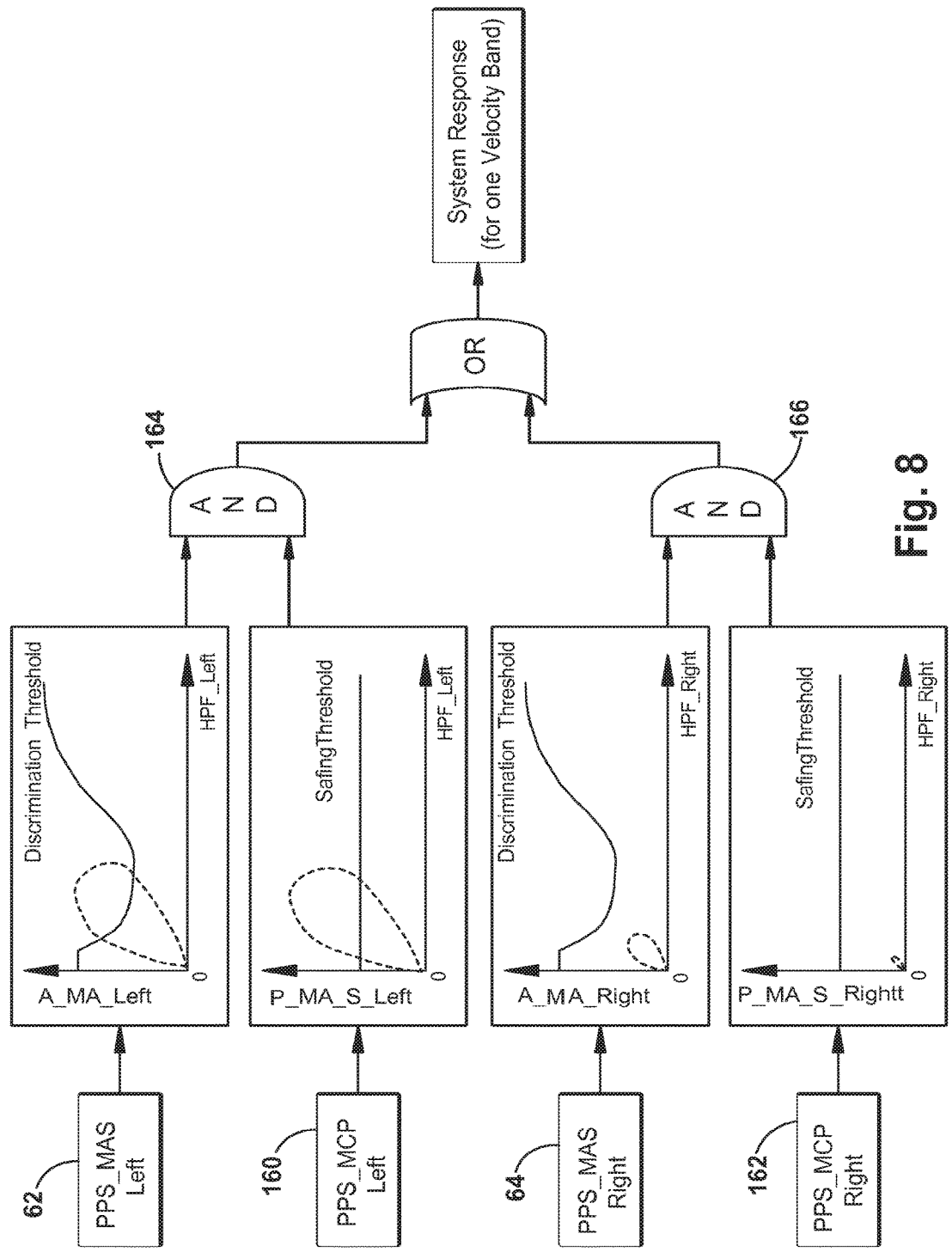

FIGS. 5-8 depict various example discrimination conditions for the vehicle sensor architecture shown in FIG. 3 using the control logic shown in FIG. 4. In particular, FIG. 5 depicts the affect of a severe rough-road misuse condition (a condition for which actuation of the actuators 86, 88 is not desired) when the vehicle velocity falls within one vehicle velocity band. As can be seen, since neither the left or right pressure safing values cross their associated threshold, no actuation of the actuators 86, 88 would occur. FIG. 6 depicts the affect of a left impact misuse condition (a condition for which actuation of the actuators 86, 88 is not desired) when the vehicle velocity falls within one vehicle velocity band. As can be seen, although the PPS_MCP Left exceeds its associated threshold, the left acceleration signal PPS_MAS does not exceed its threshold. Since neither the right pressure signal nor right acceleration signal exceed their associated thresholds, no actuation occurs of the actuators 86, 88. FIG. 7 depicts a no fire left vehicle/pedestrian impact event in which the left pressure sensor PPS_MCP Left exceeds its associated threshold but the left acceleration sensor PPS_MAS does not exceed its associated threshold. FIG. 8 depicts a must fire left vehicle/pedestrian impact event. As can be seen, since both the PPS_MAS Left acceleration exceeds its associated threshold and the left pressure PPS_MCP Left exceeds its associated threshold, the actuators 86, 88 would be actuated.

Figure 9:
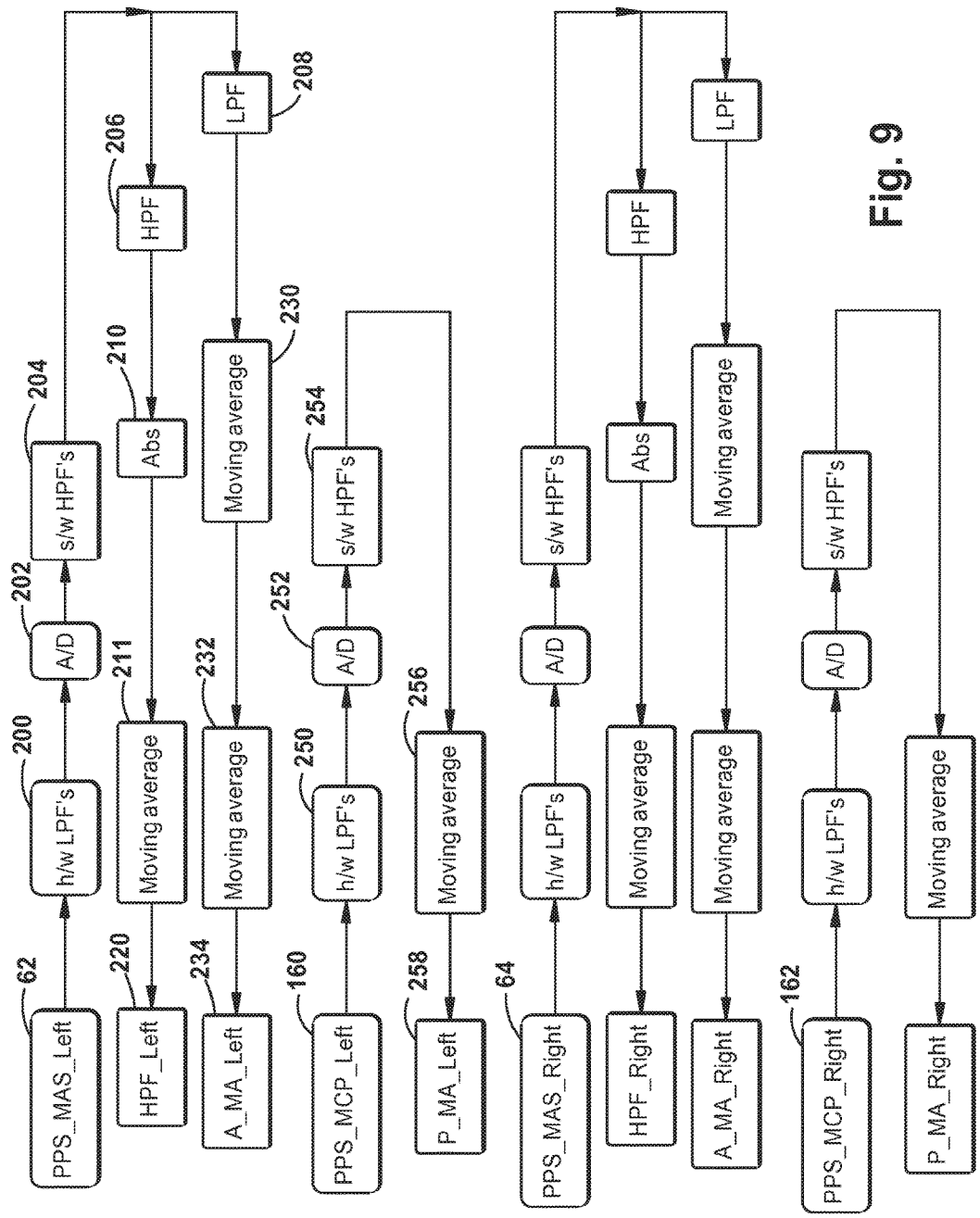
FIG. 9 is a block diagram showing another portion of the discrimination control logic of the electronic controller of FIG. 3.

Referring to FIG. 9, the determination metric calculations for the sensor architecture shown in FIG. 3 and the control logic shown in FIG. 4 will be appreciated. Each of the acceleration sensors 62, 64 output an electrical signal having electrical characteristics such as frequency and amplitude indicative of a vehicle/pedestrian impact event resulting in acceleration of at least that portion of the vehicle where the sensors are mounted. Each sensor 62, 64 has its own associated metric calculation to determine displacement values over a time window and to determine an impact energy value based on impact energy over a particular frequency range. The controller 80' performs each of these metric calculations to determine associated displacement values and impact energy. The output signal PPS_MAS Left from the accelerometer 62 is low-pass filtered using, for example, a hardware filter 200 (anti-alias filter). The low-pass filter 200 passes a signal of a first frequency band, e.g., frequencies from 0-800 Hz. The filtered signal is converted to a digital signal using an analog-to-digital converter 202 for further processing by the ECU 80'. The ECU 80' then high-pass filters the signal using a high-pass filter 204 so as to remove any sensor bias (DC drift). The high-passed signal is then further high-pass filtered 206 to eliminate frequencies from DC-400 Hz where 400 Hz is a calibratable number. The output of HPF 206 contains frequency values between 400-800 Hz. The HPF 206 also eliminates signal characteristics the result from rough road events. A second high-pass filter can be cascaded to form a second order filter to obtain a sharper cutoff if so desired. An absolute value 210 of the high-pass filtered 206 signal is then determined using function 210. The absolute value of the filter acceleration signal is indicative of the impact energy based on the acceleration signal from the left acceleration sensor 62. A moving average A_MA of the absolute value of the signal is determined in function 211 for smoothing purposes. The resultant signal is a high-pass filter signal 220, designated HPF_Left, and is indicative of impact energy within a particular frequency range (e.g., 400-800 Hz) of interest. This HPF_Left impact energy value is useful in determining the occurrence of a vehicle/pedestrian impact event.

The output of the filter 204 is also used to determine displacement values (double integral of acceleration) over a time window. Specifically, the output of the HPF 204 is low-passed filtered by a low-pass filter 208 so as to pass signals with a frequency between DC and 220 Hz, for example. The output of the LPF 208 is processed by a first moving average calculation function 230 (first integral) followed by a second moving average calculation function 232 (second integral) to arrive at a first displacement value 234 which is designated A_MA_Left.

Values for HPF_Right (impact energy right side) and A_MA_Right (displacement value right side) are similarly determined.

The pressure left value from hose 160 as detected by the pressure sensor 76' is low-passed filtered, using, for example, a hardware filter 250, converted to a digital value using A/D converter 252 and high-passed filtered, by for example, a software high-pass filter 254. A pressure moving average value is determined using function 256 that provides the P_MA_Left moving average value 258 for further processing by the ECU 80'.

The P-MA-Right value is similarly determined.

Figure 10:
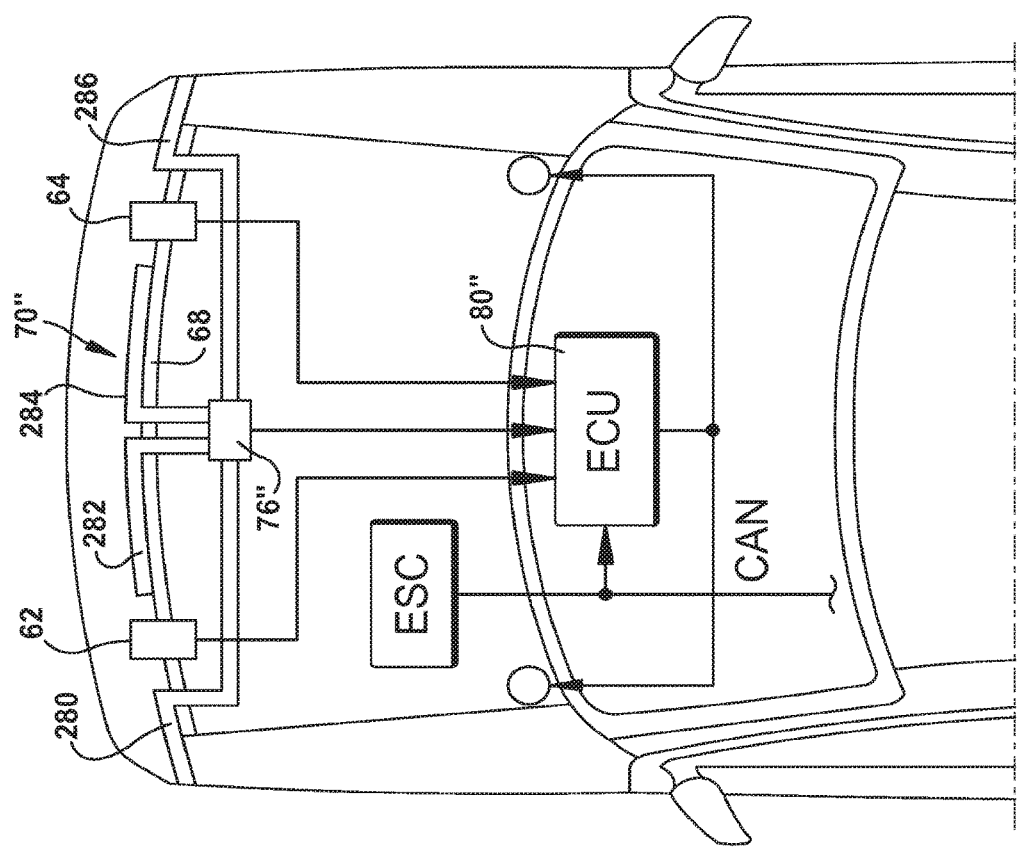
FIG. 10 illustrates a vehicle/pedestrian impact detection device in accordance with yet another exemplary embodiment of the present invention.

FIG. 10 shows another sensor architecture, in accordance with yet another example embodiment of the present invention, having the acceleration sensors 62, 64 mounted to the cross-member 68 as previously described. The pressure sensor 70" includes a multi-channel pressure ("PPS_MCP") sensor 76" having four pressure hoses connected thereto. The pressure sensor 76" is a four channel pressure sensor. A pressure hose 280 is mounted to the far left portion of the bumper structure, a pressure hose 282 is mounted to the left center portion of the bumper structure, a pressure hose 284 is mounted to the right center of the bumper structure, and a pressure hose 286 is mounted to the far right portion of the bumper structure. With this arrangement, the left and right sides of the bumper each have two pressure signals that are used by the ECU 80" for a vehicle/pedestrian impact analysis in a manner similar to described above. With this structure, the pressure signals detected from the two left pressure hoses could be either AND'ed or OR'ed to provide a left side pressure safing determination. Similarly, the pressure signals detected from the two right pressure hoses could be either AND'ed or OR'ed to provide a right side pressure safing determination. The resultant pressure safing determinations could be AND'ed with the associated side discrimination determinations based on the associated acceleration signal evaluations.

It should be appreciated that the present invention improves vehicle/pedestrian impact sensing performance by providing a fast time to deploy with a good margin against misuse and rough-road conditions. The acceleration sensors, which serve as the primary vehicle/pedestrian impact discrimination sensors, provide sensing capabilities (e.g., frequency and amplitude) in discriminating different types of impact events, while the pressure sensor(s) provide a secondary vehicle/pedestrian impact discrimination sensor that improves the system robustness by effectively providing a filter against other types of non-impact vehicle events such as experienced during rough-road conditions.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting a vehicle/pedestrian impact comprising:
   at least one acceleration sensor mounted near a forward location of a vehicle for providing an associated acceleration signal indicative of an impact event;

at least one pressure sensor mounted near the forward location of the vehicle for providing a first pressure signal associated with a left side of the vehicle and a second pressure signal associated with a right side of the vehicle, the first and second pressure signals being indicative of an impact event; and a controller configured to determine if a vehicle/pedestrian impact event has occurred in response to the acceleration signal and the first and second pressure signals, wherein the controller is configured to determine if a vehicle/pedestrian impact event has occurred by determining an impact energy value from the acceleration signal, comparing a first determined moving average value of the first pressure signal as a function of the impact energy value against a first associated threshold value, and comparing a second determined moving average value of the second pressure signal as a function of the impact energy value against a second associated threshold, wherein the controller is further configured to provide an actuation control signal in response to determining the impact event occurred.

2. The apparatus of claim 1 wherein the first and second associated thresholds are identical.

3. The apparatus of claim 1 where the first and second associated threshold values are selected in response to monitored vehicle speed.

4. The apparatus of claim 1 further including an actuatable vehicle/pedestrian impact mitigation device attached to the vehicle and being responsive to the actuation control signal.

5. The apparatus of claim 1 wherein the impact energy value is determined from frequency components of the acceleration signal over a predetermined frequency range.

6. The apparatus of claim 1 wherein the at least one acceleration sensor includes two spaced apart sensors mounted to a forward structure of the vehicle.

7. The apparatus of claim 1 wherein the at least one acceleration sensor includes three spaced apart sensors mounted to a forward structure of the vehicle.

8. The apparatus of claim 1 wherein the at least one pressure sensor includes a single channel pressure sensor and a single pressure tube connected to the single channel pressure sensor, the pressure tube having a closed distal end and is mounted to a forward structure of the vehicle.

9. The apparatus of claim 1 wherein the at least one acceleration sensor comprises a first acceleration sensor mounted at a center forward location of the vehicle, a second acceleration sensor mounted at a leftward forward location of the vehicle, and a third acceleration sensor mounted at a rightward forward location of the vehicle.

10. The apparatus of claim 1 wherein the at least one pressure sensor is a multi channel pressure sensor having a plurality of pressure hoses connected thereto, the plurality of pressure hoses being mounted near the forward location of the vehicle for providing an associated pressure signal indicative of an impact event.

\* \* \* \* \*